United States Patent
Xu et al.

(10) Patent No.: US 9,472,143 B2
(45) Date of Patent: Oct. 18, 2016

(54) PIXEL STRUCTURE AND DRIVING METHOD THEREOF, DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yizhen Xu, Beijing (CN); Zhihua Sun, Beijing (CN); Xingji Wu, Beijing (CN); Jianming Wang, Beijing (CN); Baoyu Liu, Beijing (CN); Liang Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 242 days.

(21) Appl. No.: 14/235,631

(22) PCT Filed: Jun. 4, 2013

(86) PCT No.: PCT/CN2013/076694
§ 371 (c)(1),
(2) Date: Jan. 28, 2014

(87) PCT Pub. No.: WO2014/153837
PCT Pub. Date: Oct. 2, 2014

(65) Prior Publication Data
US 2015/0332639 A1    Nov. 19, 2015

(30) Foreign Application Priority Data
Mar. 27, 2013    (CN) .......................... 2013 1 0102561

(51) Int. Cl.
*H01L 33/32*    (2010.01)
*G09G 3/36*    (2006.01)
(Continued)

(52) U.S. Cl.
CPC .......... *G09G 3/3607* (2013.01); *G02F 1/1368* (2013.01); *G02F 1/134336* (2013.01);
(Continued)

(58) Field of Classification Search
CPC ..... H01L 33/32; H01L 33/50; H01L 33/502; H01L 33/504
USPC .......................................................... 257/89
See application file for complete search history.

(56) References Cited

U.S. PATENT DOCUMENTS

| | | | |
|---|---|---|---|
| 2012/0162573 A1 | 6/2012 | Takahashi et al. | |
| 2014/0054624 A1* | 2/2014 | Chen | H01L 27/156 257/89 |

FOREIGN PATENT DOCUMENTS

| | | |
|---|---|---|
| CN | 101136150 A | 3/2008 |
| CN | 101221337 A | 7/2008 |
| CN | 102483543 A | 5/2012 |
| CN | 102693701 A | 9/2012 |
| WO | 2011081160 A1 | 7/2011 |

OTHER PUBLICATIONS

International Search Report mailed Sep. 1, 2014; PCT/CN2013/076694.
(Continued)

*Primary Examiner* — Monica D Harrison
(74) *Attorney, Agent, or Firm* — Ladas & Parry LLP

(57) ABSTRACT

A pixel structure and driving method thereof, a display panel and a display device. The pixel structure includes a plurality of sub-pixels arranged in a form of array, each sub-pixel is driven by a thin film transistor; wherein, sub-pixels provided in a same row are driven by two gate lines located thereon and thereunder; one data line serves to drive two columns of sub-pixels located on two sides of it; a plurality of sub-pixels in two adjacent rows that are driven by one data line constitute one pixel unit. For the pixel structure, there is further provided a driving method, and the pixel structure is easy to be driven and has a simple sequence control.

17 Claims, 4 Drawing Sheets

(51) Int. Cl.
*G02F 1/1368* (2006.01)
*G02F 1/1343* (2006.01)
*G02F 1/1362* (2006.01)
*G02F 1/1333* (2006.01)

(52) U.S. Cl.
CPC ....... *G02F1/136286* (2013.01); *G09G 3/3688* (2013.01); *G02F 2001/133391* (2013.01); *G02F 2201/52* (2013.01); *G09G 3/3614* (2013.01); *G09G 2300/0426* (2013.01)

(56) References Cited

OTHER PUBLICATIONS

Second Chinese Office Action Appln. No. 201310102561.8; Dated Apr. 21, 2015.
First Chinese Office Action dated Jan. 6, 2015; Appln. No. 201310102561.8.
International Preliminary Report on Patentability Appln. No. PCT/CN2013/076694; Dated Sep. 29, 2015.

\* cited by examiner

PIXEL STRUCTURE AND DRIVING METHOD THEREOF, DISPLAY PANEL AND DISPLAY DEVICE

FIELD OF THE INVENTION

Embodiments of the present invention relate to a pixel structure and driving method thereof, a display panel and a display device.

BACKGROUND

Among flat panel display technologies, thin film transistor liquid crystal display (TFT-LCD) has features of being low power consumption, relatively low manufacturing cost and radiation free, and thus plays a leading role in the market for flat panel displays. A pixel structure composed by a plurality of sub-pixels are provided in a TFT-LCD, gate lines and data lines that are arranged to cross over are provided on a conventional pixel structure, and one sub-pixel is provided at each of intersections of the gate lines and the data lines (generally, three sub-pixels of red, green and blue constitute one visible pixel unit). Each sub-pixel is connected to a gate line and a data line that are adjacent to it through a thin film transistor. In order to reduce the number of data lines and simplify the driving process, there is also a pixel structure in which the number of data lines is reduced by half. As illustrated in FIG. 1, in a pixel structure with data lines S of halved number, the number of data lines S is reduced by half, and the number of gate lines G is doubled. Namely, one data line S is connected to two columns of sub-pixels A1-2 on two sides of it, respectively, and two sub-pixels A1-2 in the same row that are connected to the same data line S are connected to two gate lines G, respectively, in which, sub-pixels constituting one pixel unit are arranged in a row. Upon a first row gate line G1 being driven, sub-pixels A1-2 disposed on the left side of data lines S are turned on in sequence (i.e. R11, B11, G12, R13, B13, G14 . . . R1n-1, B1n-1, G1n); and upon a second row gate line G2 being driven, sub-pixels A1-2 in a first row that are disposed on the right side of data lines S are turned on in sequence (i.e. G11, R12, B12, G13, R14, B14 . . . G1n-1, R1n, B1n). In this way, scanning is conducted sequentially row by row. Therefore, three sub-pixels in the same pixel unit are driven by two data lines actually. As illustrated in FIG. 2, which is a sequence chart illustrating the source driving of the pixel structure, driving of two rows of gate line G is a cycle.

If the above pixel structure with a configuration of halved number of data lines S is adopted, then because two driving transmission directions of being upright and inverted as illustrated in FIG. 3 must be taken into account in the design of driving of the pixel structure, it must be required that sub-pixels A1-2 whose number is a multiple of 12 shall be provided in the pixel structure. Otherwise, the final number of data lines would be an odd number. Due to a sequence controller (Tcon) algorithm, it results in the fact that an empty set (i.e. unprofitable data) will occur upon inverted transferring. The design of the above pixel structure is limited, and the sequence is complex.

SUMMARY

The technical problems to be solved by the invention include, aiming at problems of limitation in design and complex sequence control of an existing pixel structure that has a configuration of halved number of data lines, there are provided a pixel structure and driving method thereof, a display panel and a display device, which has a structure easy to realize and a simple sequence control.

A technical scheme employed to solve technical problems of the invention is a pixel structure, comprising a plurality of sub-pixels arranged in an array form, each sub-pixel is driven by a thin film transistor; wherein, sub-pixels provided in a same row are driven by two gate lines located thereon and thereunder; one data line serves to drive two columns of sub-pixels located on two sides of it; and a plurality of sub-pixels in two adjacent rows that are driven by one data line constitute one pixel unit.

Each pixel unit in the pixel structure of embodiments of the invention includes four sub-pixels, so it has a better effect of light perception from the view of optics, and moreover, such an arranging mode that four pixels constitute one pixel unit has less wiring.

In one example, the pixel structure adopts a form of dual-gate, in which, the pixel unit includes four sub-pixels located on two sides of a same data line, the arranging mode of the four sub-pixels is two sub-pixels per row and two sub-pixels per column, each of the sub-pixels is driven by one gate line, and sub-pixels in the same row are driven by two gate lines located on two sides of them alternately.

In one example, each pixel unit includes four sub-pixels in different colors.

In one example, the sub-pixels in different colors include a red sub-pixel, a green sub-pixel, a blue sub-pixel and a yellow sub-pixel.

In one example, the sub-pixels in different colors include a red sub-pixel, a green sub-pixel, a blue sub-pixel and a white sub-pixel.

According to another embodiment of the invention, there is provided a display panel, comprising:

a plurality of sub-pixels arranged in a form of array, each sub-pixel is driven by a thin film transistor;

a plurality of gate lines extending along a row direction of the array; and a plurality of data lines extending along a column direction of the array, wherein, sub-pixels provided in a same row are driven by two gate lines located thereon and thereunder;

one data line serves to drive two columns of sub-pixels located on two sides of it; and a plurality of sub-pixels in two adjacent rows that are driven by one data line constitute one pixel unit.

A technical scheme employed to solve technical problems of the invention is a driving method of the above pixel structure, comprising the following steps:

turning on a first gate line corresponding to a pixel unit, and driving a sub-pixel connected to the first gate line through a data line;

turning on a second gate line corresponding to the pixel unit, and driving a sub-pixel connected to the second gate line through a data line;

turning on a third gate line corresponding to the pixel unit, and driving a sub-pixel connected to the third gate line through a data line;

turning on a fourth gate line corresponding to the pixel unit, and driving a sub-pixel connected to the fourth gate line through a data line.

According to embodiments of the invention, there is provided a new driving method on the basis of the above pixel structure, which has a simple sequence control and is easy to be realized.

According to a technical scheme of embodiments of the invention, there is further provided a display device, comprising the above pixel structure.

Because the display device includes the above pixel structure and each pixel unit is composed of four sub-pixels, its picture feeling is better.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but are not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which come(s) into the scope sought for protection by the invention.

First Embodiment

According to the embodiment, there is provided a pixel structure, comprising a plurality of sub-pixels A1-2 arranged in an array form, each sub-pixel is driven by a thin film transistor A1-1. Sub-pixels A1-2 provided in the same row are driven by two gate lines G located thereon and thereunder alternately; one data line S serves to drive two columns of sub-pixels A1-2 located on two sides of it; and a plurality of sub-pixels A1-2 in two adjacent rows that are driven by one data line S constitute one pixel unit A.

Figure 1:
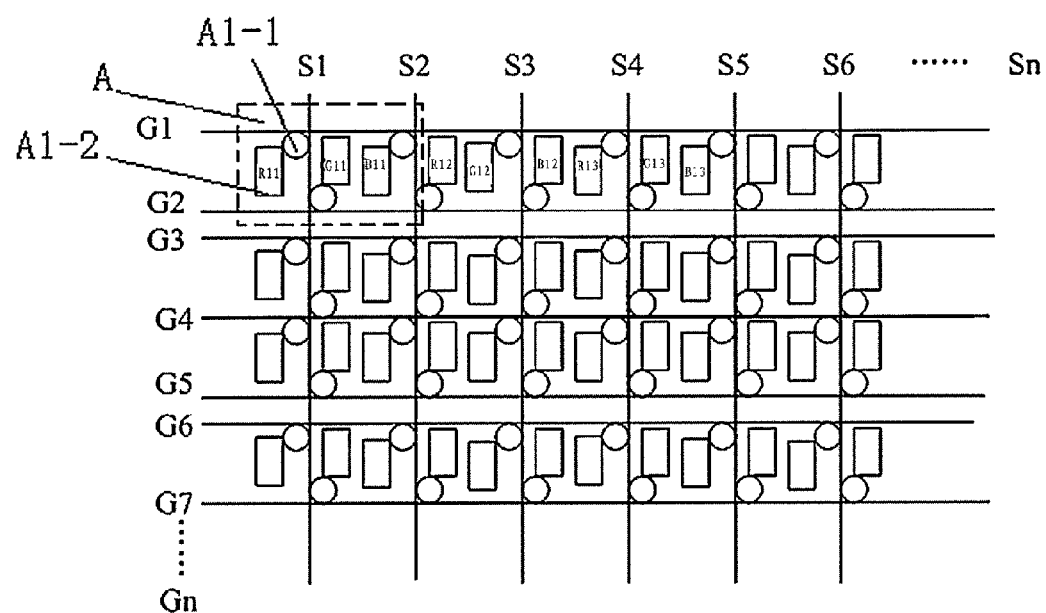
FIG. 1 is a structural view illustrating an existing pixel structure with halved data line.
Figure 2:
FIG. 2 is a diagram illustrating a sequence chart of the existing pixel structure with halved data line.
Figure 3:
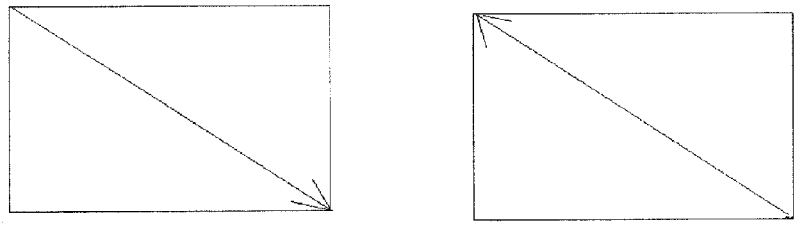
FIG. 3 is a schematic view illustrating upright and inverted directions regarding design of pixel structure.
Figure 4:
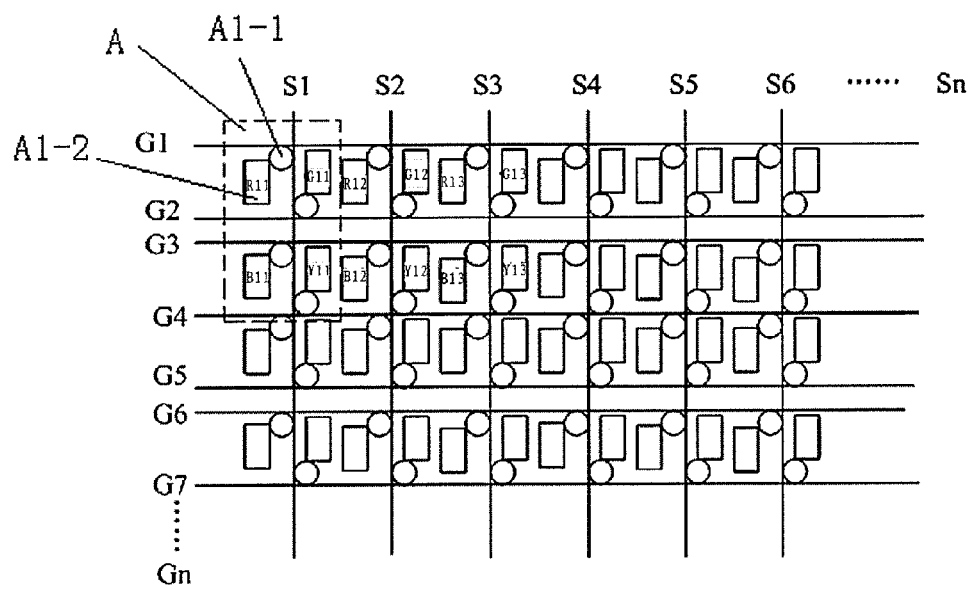
FIG. 4 is a structural view illustrating a pixel structure with halved data line according to a first embodiment of the invention.

As illustrated in FIG. 4, for example, the pixel structure adopts a form of dual-gate (a form of reducing the number of data lines by half). The pixel unit A includes four sub-pixels A1-2 located on two sides of the same data line S, the arranging mode of the four sub-pixels is two sub-pixels A1-2 per row and two sub-pixels A1-2 per column, each of the sub-pixels A1-2 is driven by one gate line G, and sub-pixels A1-2 in the same row are driven by two gate lines G located on two sides of them alternately. The pixel structure is composed of a plurality of pixel units A, and one pixel unit A is composed of four adjacent sub-pixels A1-2 in different colors (the colors may be produced by color filters, which may be located on a color filter substrate, and may also be located on the pixel structure), wherein, four sub-pixels A1-2 may be in multiple, different modes. For example, the four sub-pixels A1-2 include a red sub-pixel, a green sub-pixel, a blue sub-pixel and a yellow sub-pixel; or include a red sub-pixel, a green sub-pixel, a blue sub-pixel and a white sub-pixel.

Four sub-pixels A1-2 of one pixel unit A are located on two sides of one data line S, respectively, and two adjacent sub-pixels A1-2 are disposed at each side.

That is, four sub-pixels A1-2 of one pixel unit are arranged, for example, into a "square", so that the display effect is better, and the wiring becomes more convenient.

Each gate line G of the pixel structure serves to drive one kind of sub-pixels A1-2 disposed in the row (for example, a first scan line only serves to drive a red sub-pixel disposed in a first row), and one data line S corresponds to four gate lines G. With this structure, the wiring connection is simple, thereby simplifying the driving process.

Second Embodiment

According to the embodiment, there is provided a driving method of the pixel structure according to the first embodiment, the steps of which are as follows:

allowing a first gate line G1 corresponding to a pixel unit A to be turned on, and driving a sub-pixel A1-2 (i.e. R11, R12, R13 . . . R1n) connected to the first gate line G1 through a data line S;

allowing a second gate line G2 corresponding to the pixel unit A to be turned on, and driving a sub-pixel A1-2 (i.e. G11, G12, G13 . . . G1n) connected to the second gate line G2 through a data line S;

allowing a third gate line G3 corresponding to the pixel unit A to be turned on, and driving a sub-pixel A1-2 (i.e. B11, B12, B13 . . . B1n) connected to the third gate line G3 through a data line S;

allowing a fourth gate line G4 corresponding to the pixel unit A to be turned on, and driving a sub-pixel A1-2 (i.e. Y11, Y12, Y13 . . . Y1n) connected to the fourth gate line G4 through a data line S.

The gate lines G are each turned on in sequence.

Figure 5:
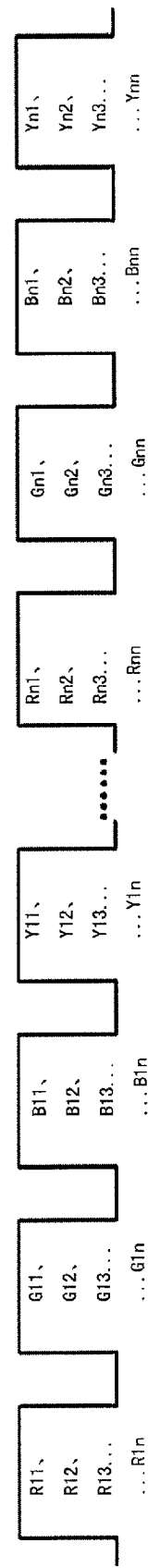
FIG. 5 is a diagram illustrating a sequence chart of a pixel structure with halved data line according to a second embodiment of the invention.

FIG. 5 is a sequence chart illustrating the driving process of a pixel unit A of the pixel structure with this configuration. When it is compared to a sequence chart illustrating the driving process of a pixel unit A of a pixel structure in prior art, it can be seen that, embodiments of the invention demonstrate a simple sequence, and are easy to be realized.

Third Embodiment

According to the embodiment, there is provided a display panel, comprising the pixel structure in the first embodiment. And, the display panel can be driven by using the driving method in the second embodiment. As the pixel structure and driving method thereof have been described in detail hereinbefore, details are omitted here. In addition, the display panel here includes a liquid crystal display panel and an organic light emitting display panel, but is not limited thereto.

Fourth Embodiment

According to the embodiment, there is provided a display device, comprising the pixel structure in the first embodiment or the display panel in the third embodiment. The display device may be a cell phone, a tablet computer, a television, a display, a notebook PC, a digital photo frame, a navigator or any other product or component possessing a display function.

In the display device according to the embodiment, there is provided the pixel structure in the first embodiment, in which each pixel unit is composed of four sub-pixels. So, its picture effect is good.

Certainly, in the display device according to the embodiment, other conventional structures, such as power source unit, display driving unit, and the like, may further be included.

Descriptions made above are merely exemplary embodiments of the invention, but are not used to limit the protection scope of the invention. The protection scope of the invention is determined by attached claims.

What is claimed is:

1. A pixel structure, comprising a plurality of sub-pixels arranged in a form of array, each sub-pixel is driven by a thin film transistor; wherein,
    sub-pixels provided in a same row are driven by two gate lines located thereon and thereunder;
    one data line serves to drive two columns of sub-pixels located on two sides of it;
    a plurality of sub-pixels in two adjacent rows that are driven by one data line constitute one pixel unit.

2. The pixel structure according to claim 1, wherein, the pixel structure adopts a form of dual-gate, in which, the pixel unit includes four sub-pixels located on two sides of a same data line, the four sub-pixels have an arranging mode of two sub-pixels per row and two sub-pixels per column, each of the sub-pixels is driven by one gate line, and sub-pixels in the same row are driven by two gate lines located on two sides of them alternately.

3. The pixel structure according to claim 2, wherein, each pixel unit includes four sub-pixels in different colors.

4. The pixel structure according to claim 3, wherein, the sub-pixels in different colors include a red sub-pixel, a green sub-pixel, a blue sub-pixel and a yellow sub-pixel.

5. The pixel structure according to claim 3, wherein, the sub-pixels in different colors include a red sub-pixel, a green sub-pixel, a blue sub-pixel and a white sub-pixel.

6. The pixel structure according to claim 1, wherein, each pixel unit includes four sub-pixels in different colors.

7. The pixel structure according to claim 6, wherein, the sub-pixels in different colors include a red sub-pixel, a green sub-pixel, a blue sub-pixel and a yellow sub-pixel.

8. The pixel structure according to claim 6, wherein, the sub-pixels in different colors include a red sub-pixel, a green sub-pixel a blue sub-pixel and a white sub-pixel.

9. A display panel, comprising:
    a plurality of sub-pixels arranged in a form of array, each sub-pixel is driven by a thin film transistor;
    a plurality of gate lines extending along a row direction of the array; and
    a plurality of data lines extending along a column direction of the array, wherein,
    sub-pixels provided in the same row are driven by two gate lines located thereon and thereunder;
    one data line serves to drive two columns of sub-pixels located on two sides of it; and
    a plurality of sub-pixels in two adjacent rows that are driven by one data line constitute one pixel unit.

10. The display panel according to claim 9, wherein, the pixel unit includes four sub-pixels located on two sides of a same data line, the four sub-pixels have an arranging mode of two sub-pixels per row and two sub-pixels per column, each of the sub-pixels is driven by one gate line, and sub-pixels in a same row are driven by two gate lines located on two sides of them alternately.

11. The display panel according to claim 10, wherein, each pixel unit includes four sub-pixels in different colors.

12. The display panel according to claim 11, wherein, the sub-pixels in different colors include a red sub-pixel, a green sub-pixel, a blue sub-pixel and a yellow sub-pixel.

13. The display panel according to claim 11, wherein, the sub-pixels in different colors include a red sub-pixel, a green sub-pixel, a blue sub-pixel and a white sub-pixel.

14. The display panel according to claim 9, wherein, each pixel unit includes four sub-pixels in different colors.

15. The display panel according to claim 14, wherein, the sub-pixels in different colors include a red sub-pixel, a green sub-pixel, a blue sub-pixel and a yellow sub-pixel.

16. The display panel according to claim 14, wherein, the sub-pixels in different colors include a red sub-pixel, a green sub-pixel, a blue sub-pixel and a white sub-pixel.

17. A display device, comprising the pixel structure according to claim 9.

* * * * *